Aug. 21, 1951    R. J. SHAW    2,565,327

CATHODE RAY TUBE MOUNTING MEANS

Filed Nov. 28, 1949

Inventor:
Robert J. Shaw,
by Merton D. Morse
His Attorney.

Patented Aug. 21, 1951

2,565,327

UNITED STATES PATENT OFFICE 2,565,327

CATHODE-RAY TUBE MOUNTING MEANS

Robert J. Shaw, Fulton, N. Y., assignor to General Electric Company, a corporation of New York Application November 28, 1949, Serial No. 129,718

5 Claims. (Cl. 177—316)

My invention relates to electrical apparatus of the type employing cathode ray tubes and, more particularly, to means for mounting cathode ray tubes within such apparatus. While my invention is of general utility, it is particularly adapted for use as a cathode ray tube support in a conventional television receiver.

In many instances, the physical dimensions of different cathode ray tubes, which are nominally of the same size, actually vary over a relatively wide range of values. Such a situation arises in the case of cathode ray tubes employing glass bulbs wherein it is difficult to maintain uniformity in glass blowing arrangements. As a result, the bulb diameter and other dimensions of the cathode ray tube may vary over extremely wide values with a given nominal tube size. In order to provide a cathode ray tube mount which is suitable for mass production apparatus such as television receivers, and which will accommodate cathode ray tubes with varying bulb sizes, it is necessary to provide a mounting means which automatically adapts to variations in bulb dimensions.

Also, in competitively marketed television receivers, situations frequently arise wherein space limitations or cost considerations dictate a mounting support for a cathode ray tube which is of low cost, is simple to assemble, and does not interfere with other closely spaced operative portions of the receiver. Accordingly, it is a primary object of my invention to provide a new and improved supporting structure for the cathode ray tube of a television receiver.

It is another object of my invention to provide a mounting means for the cathode ray tube of a television receiver wherein the cathode ray tube is supported entirely from the front panel of the receiver.

It is a further object of my invention to provide a new and improved mounting means for the cathode ray tube of a television receiver wherein provision is made to accommodate cathode ray tubes having widely varying bulb dimensions.

It is a still further object of my invention to provide a new and improved mounting structure for a cathode ray tube wherein means are provided for connecting the exterior of the cathode ray tube bulb to a point of fixed potential.

Figure 1:
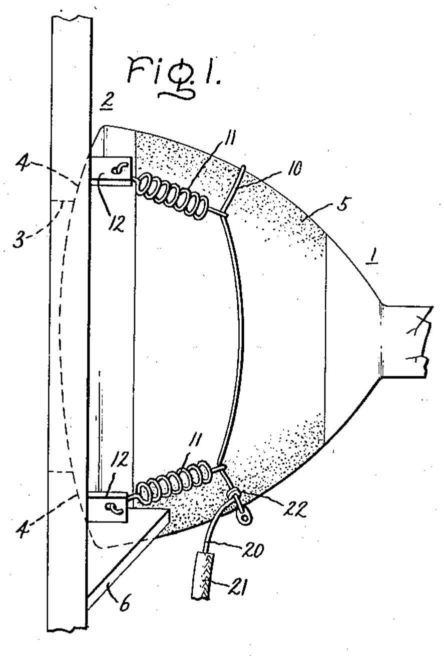
Figure 2:
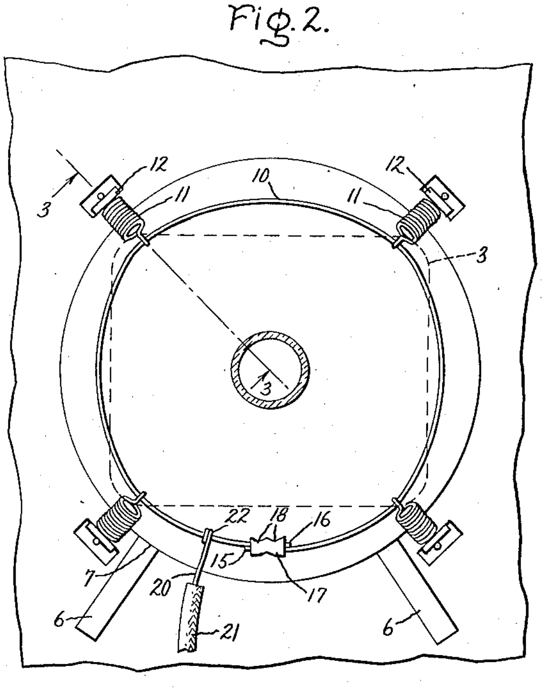
Figure 3:
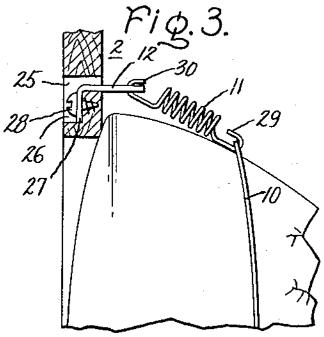

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a side elevational view of my improved cathode ray tube mounting structure; Fig. 2 is a rear elevational view of the structure of Fig. 1; and Fig. 3 is a sectional side elevational view of a portion of the structure of Fig. 2 taken along the line 3—3 thereof.

Referring now more particularly to Fig. 1 of the drawing, there is therein illustrated a cathode ray tube indicated generally at 1, which is to be mounted on and held against a front panel of the television receiver which is indicated generally at 2 and which may be made of wood or any other suitable cabinet material. The front panel 2 is provided with an aperture 3 through which the cathode ray tube 1 may be viewed. The portions of the front panel adjacent the aperture 3 serve to mask the outer portions of the cathode ray tube viewing screen and to define the conventional television picture having an aspect ratio of approximately 3 to 4. Inasmuch as the viewing screen of the cathode ray tube 1 is slightly curved, the portions of the panel 2 adjacent the aperture 3 are provided with beveled or undercut portions 4 against which the front face of the cathode ray tube 1 is to be securely held. The bulb of the cathode ray tube 1 is provided on the flared exterior surface thereof with a conductive coating 5 which acts in conjunction with the accelerating anode of the tube as a capacitive filter for the accelerating anode and a shield against stray radiations. The conductive coating 5 must necessarily be connected to a point of fixed potential, such as ground, to operate satisfactorily.

In accordance with my invention, the cathode ray tube is supported entirely from the front panel of the receiver. To this end, a pair of supporting blocks 6 are positioned on the back side of the panel 2 and extend rearwardly therefrom to define ledges upon which the front edge 7 of the bulb of the cathode ray tube 1 may rest. The blocks 6 are so spaced relative to the aperture 3 that the cathode ray tube is supported in the correct position for viewing the screen thereof through the aperture.

In order to hold the bulb of the cathode ray tube securely against the corresponding beveled portions 4 of the front panel 2, I provide a cable and spring assembly which is also supported from the panel 2. This assembly comprises a flexible cable 10 which encircles the bulb of the cathode ray tube at a point somewhat behind the viewing screen thereof. While the cable 10 may comprise any suitable material having a substantial tensile strength, I prefer to employ a conductive cable so that the cable 10 may make electrical contact with the exterior coating 5 of the cathode ray tube for reasons which will be discussed in more detail hereinafter. The cable 10 is supported by and urged toward the panel 2 through the action of a plurality of coil springs 11 which engage the cable 10 at spaced points thereon. The other end of coil springs 11 is secured to the front panel by means of mounting lugs 12, as will be described in more detail in connection with Fig. 3.

The inner diameter of the cable 10 is made substantially smaller than the maximum bulb diameter of a minimum bulb size cathode ray tube. Inasmuch as the flexible cable 10 will conform to many different bulb contours, the structure is adapted to mount cathode ray tubes of various bulb sizes without necessitating any changes therein. It will be understood that the coil springs 11 exert sufficient tension upon the flexible cable 10 at spaced points thereon, so as to hold the bulb of the cathode ray tube securely against the front panel of the receiver.

By such an arrangement, the cathode ray tube is supported entirely from the front panel of the receiver and other components of the television receiver, such as transformers, vacuum tubes and the like, may be placed in the space normally occupied by the conventional support for the neck of the cathode ray tube. In this connection, it will be understood that the conventional deflection coils and focusing coil may be positioned around the neck of the cathode ray tube 1 so as properly to reproduce the transmitted image. However, with my improved cathode ray tube mount, wherein the cathode ray tube is supported entirely from the front panel of the receiver, it is not necessary to provide additional means in conjunction with the deflection and focusing coil mounting means for supporting the neck of the cathode ray tube.

In Fig. 2 there is illustrated a rear elevation view of my improved cathode ray tube mount. This figure illustrates more clearly the relative positioning of the ring and spring assembly comprising the flexible cable 10 which conforms to varying bulb dimensions and the coil springs 11 which are secured to mounting lugs 12 extending rearwardly from the front panel of the receiver. As is illustrated in Fig. 2, the ends 15, 16 of the flexible cable 10 are wedged in place within a metal ferrule 17, the inner diameter of which is just sufficient to accommodate the two ends of the cable. The ferrule 17 is then crimped, as indicated at 18, to secure the ends of the cable therein, thus providing an endless flexible ring which encircles the bulb of the cathode ray tube.

While it is apparent that a single supporting block may be positioned on the center line of the cathode ray tube to support vertically the bulb of the cathode ray tube, I prefer to employ a pair of supporting blocks 6, as illustrated in Fig. 2, and to space them relative to the aperture 3 in the front panel of the receiver so that the viewing screen of the cathode ray tube is properly aligned with the aperture 3 when the lower edge 7 of the bulb of the cathode ray tube rests on the supporting blocks 6.

In certain instances, the outer surface of the bulb of the cathode ray tube is provided with a conductive coating which is adapted to be connected to a point of fixed potential so as to increase the capacity of the second anode circuit of the cathode ray tube and to provide proper shielding against stray radiations from other portions of the television receiver. In accordance with a further feature of my invention, the flexible cable 10 is constructed of a conductive material which makes electrical contact with the exterior bulb coating of the cathode ray tube. The conductor 20 of a lead wire 21 is conductively connected to the conductive cable 10 at a point 22 thereon and is secured thereto by means of soldering or the like. The other end of the lead wire 21 is connected to a point of fixed potential, such as the chassis of the television receiver. By this arrangement, the exterior coating of the cathode ray tube is automatically grounded through the conductive cable 10 and its associated ground wire 21 when the cathode ray tube is supported in my improved mounting structure.

While any suitable means may be utilized to support the ring and spring assembly 10, 11 from the front panel, I prefer to employ the mounting arrangement illustrated in Fig. 3. In this figure, it is evident that the front panel 2 is provided with an aperture 25 through which the mounting lug 12 may project. The aperture 25 is provided with a recessed portion 26 wherein is positioned the head 27 of lug 12 which is secured therein by means of a screw 28 or the like. The coil spring 11 is provided with hooked portions 29, 30 which engage the flexible cable 10 and mounting lug 12 respectively. It is evident from this figure that the flexible cable 10 may be readily disengaged from the springs 11 by elongating the springs and slipping the cable over the hooked portions 29 thereof.

In operation, the flexible conductive cable 10 is placed about the cathode ray tube and the cathode ray tube is supported on the blocks 6 with the screen of the cathode ray tube held against the front panel of the receiver. The coil springs 11 are then coupled to the flexible cable 10 so as to clamp the bulb of the cathode ray tube securely against the front panel of the receiver.

From the foregoing, it is evident that the present invention provides a cathode ray tube mounting means, suitable for use in television receivers, which is particularly adapted to accommodate cathode ray tubes of varying bulb sizes. In addition, the cathode ray tube is supported entirely from the front panel of the television receiver, thus freeing additional space for other components of the receiver. In the particular arrangement disclosed, means are provided for automatically grounding the outer surface of the cathode ray tube when the cathode ray tube is mounted in operative position within the receiver.

While the invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent of the United States is:

1. In a television receiver of the type having a cathode ray tube adapted for viewing the screen thereof through an apertured panel of the receiver, said cathode ray tube having a metallic surface on the flared portion of the bulb thereof adapted to be connected to a point of fixed potential, the combination of a plurality of supporting members extending rearwardly from said panel and spaced to support said cathode ray tube for viewing the screen thereof through said aperture, a flexible conductive loop encircling the bulb of said cathode ray tube and adapted conductively to engage the metallic surface of the bulb of said cathode ray tube, said loop having an inner diameter less than the greatest bulb diameter of said cathode ray tube, resilient means engaging said loop at spaced points thereon and supported by said panel for holding the bulb of said cathode ray tube against said panel, and conductive means connecting said loop to said point of fixed potential.

2. In a television receiver of the type having a cathode ray tube adapted for viewing the screen thereof through an apertured panel of the receiver, said cathode ray tube having a metallic surface on the outside of the bulb thereof adapted to be connected to a point of fixed potential, the combination of a pair of supporting members extending rearwardly from said panel and spaced to support said cathode ray tube for viewing the screen thereof through said aperture, a flexible conductive cable encircling the bulb of said cathode ray tube and adapted conductively to engage the metallic surface of the bulb of said cathode ray tube, said cable having an inner diameter less than the greatest bulb diameter of said cathode ray tube, a plurality of coil springs, one end of each of said springs engaging said cable and the other end thereof being supported by said panel at spaced points thereon, said springs urging said cable towards said panel to hold said bulb against said panel by engagement of said cable with the surface of said bulb, and conductive means connecting said cable to said point of fixed potential.

3. In a television receiver of the type having a cathode ray tube adapted for viewing the screen thereof through an apertured panel of the receiver, said cathode ray tube having a conductive coating on the outside of the flared portion of the bulb thereof adapted to be connected to a point of fixed potential, the combination of supporting means extending rearwardly of said panel and positioned for proper orientation of said cathode ray tube relative to said aperture when said cathode ray tube is rested thereon, and means for holding the bulb of said cathode ray tube against said panel comprising, a flexible conductive cable encircling the bulb of said cathode ray tube, said cable having an inner diameter less than the maximum diameter of said bulb, means for supporting said cable in concentric relation to said aperture and spaced from said panel by an amount sufficient to hold the bulb of said cathode ray tube against said panel by engagement of said cable therewith, and conductive means connecting said cable to said point of fixed potential.

4. In a television receiver of the type having a cathode ray tube adapted for viewing the screen thereof through an apertured panel of the receiver, the bulb portion of said tube having a flared metallic surface adapted to be grounded, means for supporting said cathode ray tube from said panel comprising, a pair of support members extending rearwardly from said panel and spaced to support said cathode ray tube for viewing the screen thereof through said aperture, a flexible conductive ring encircling the bulb of said cathode ray tube at a point rearward of said screen, said ring having an inner diameter less than the maximum bulb diameter of said cathode ray tube, resilient means for urging said ring towards said panel and into conductive engagement with said bulb portion, thereby securely to hold said bulb against said panel by gripping engagement of said ring with the surface of said bulb, and a ground connection electrically connected to said ring.

5. In a television receiver of the type having a cathode ray tube adapted for viewing the screen thereof through an apertured panel of the receiver, the bulb portion of said tube having a flared metallic surface adapted to be grounded, the bulb diameter of the cathode ray tube being subject to wide variations, means for supporting said cathode ray tube from said panel comprising, a plurality of support members extending rearwardly from said panel and spaced to support said cathode ray tube for viewing the screen thereof through said aperture, a bare loop conductor encircling the bulb of said cathode ray tube and engaging the metallic surface thereof, said conductor having an inner diameter less than the maximum bulb diameter of a minimum bulb size cathode ray tube, resilient means for urging said ring towards said panel and into conductive engagement with said bulb portion, thereby to hold said bulb against said panel by engagement of said ring with the surface of said bulb, and a ground connection electrically connected to said conductor.

ROBERT J. SHAW.

REFERENCES CITED

The following references are of record in the file of this patent:

UNITED STATES PATENTS

| Number | Name | Date |
|---|---|---|
| 1,348,970 | Thompson | Aug. 10, 1920 |
| 1,637,864 | Kolster | Aug. 2, 1927 |
| 2,165,779 | Blain | July 11, 1939 |
| 2,484,345 | Hinz | Oct. 11, 1949 |

FOREIGN PATENTS

| Number | Country | Date |
|---|---|---|
| 309,334 | Italy | July 3, 1933 |